Dec. 29, 1953    D. E. SHELBY    2,664,298
FOLDING TRAILER DRUM RACK
Filed Nov. 14, 1952    2 Sheets-Sheet 1
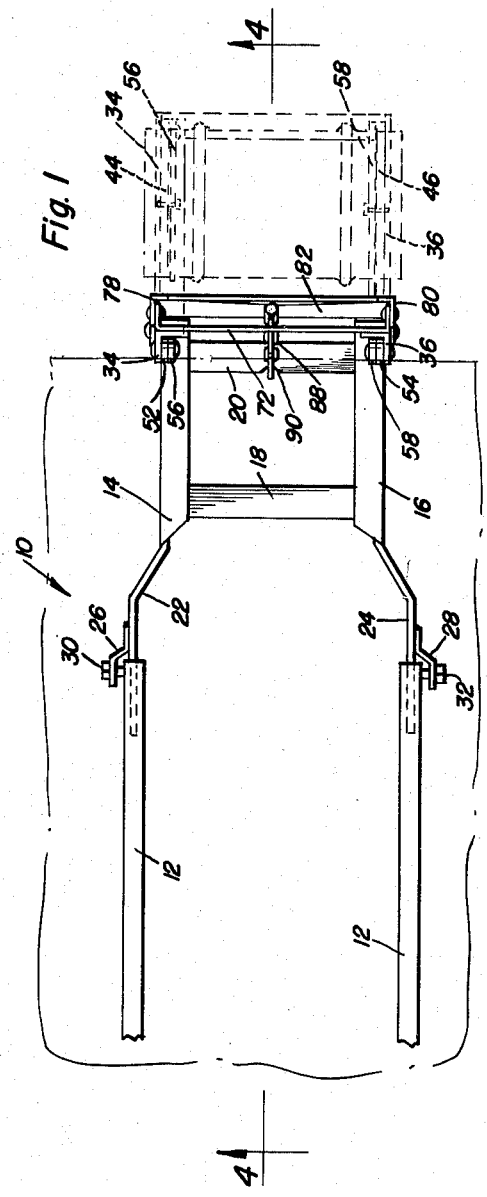
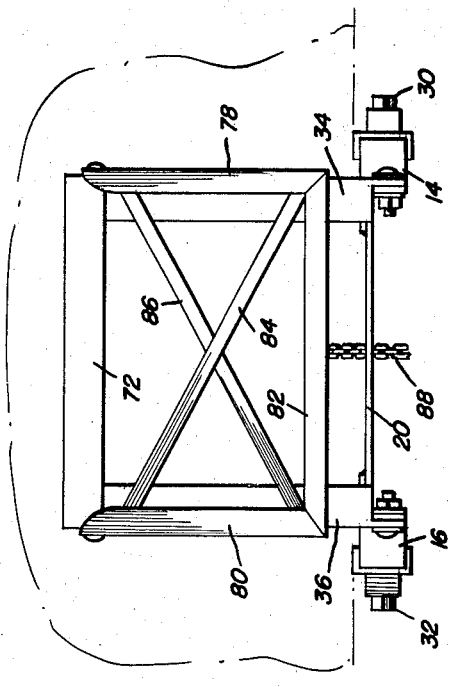
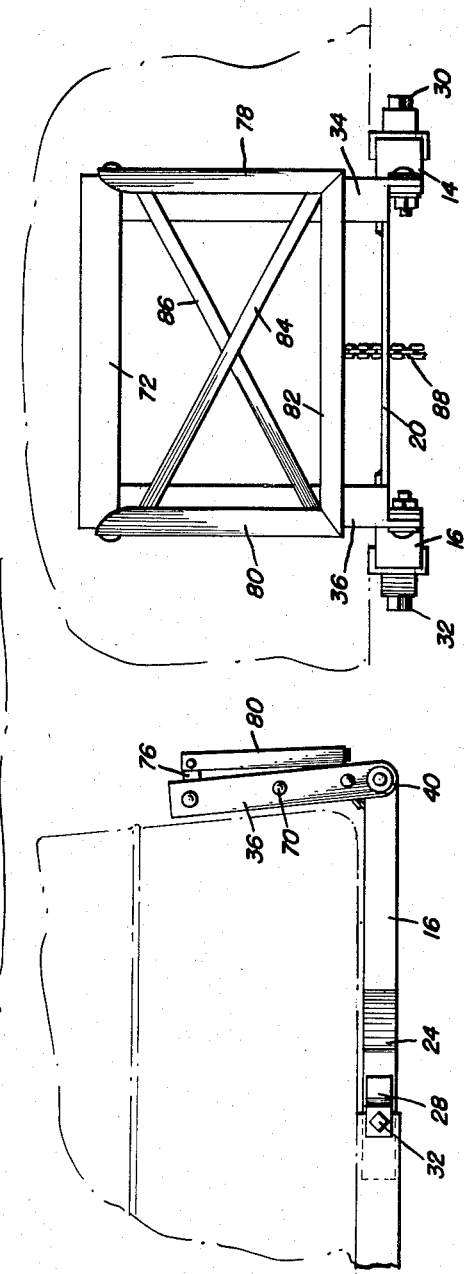
Donald E. Shelby
INVENTOR.

Dec. 29, 1953  D. E. SHELBY  2,664,298
FOLDING TRAILER DRUM RACK
Filed Nov. 14, 1952  2 Sheets-Sheet 2
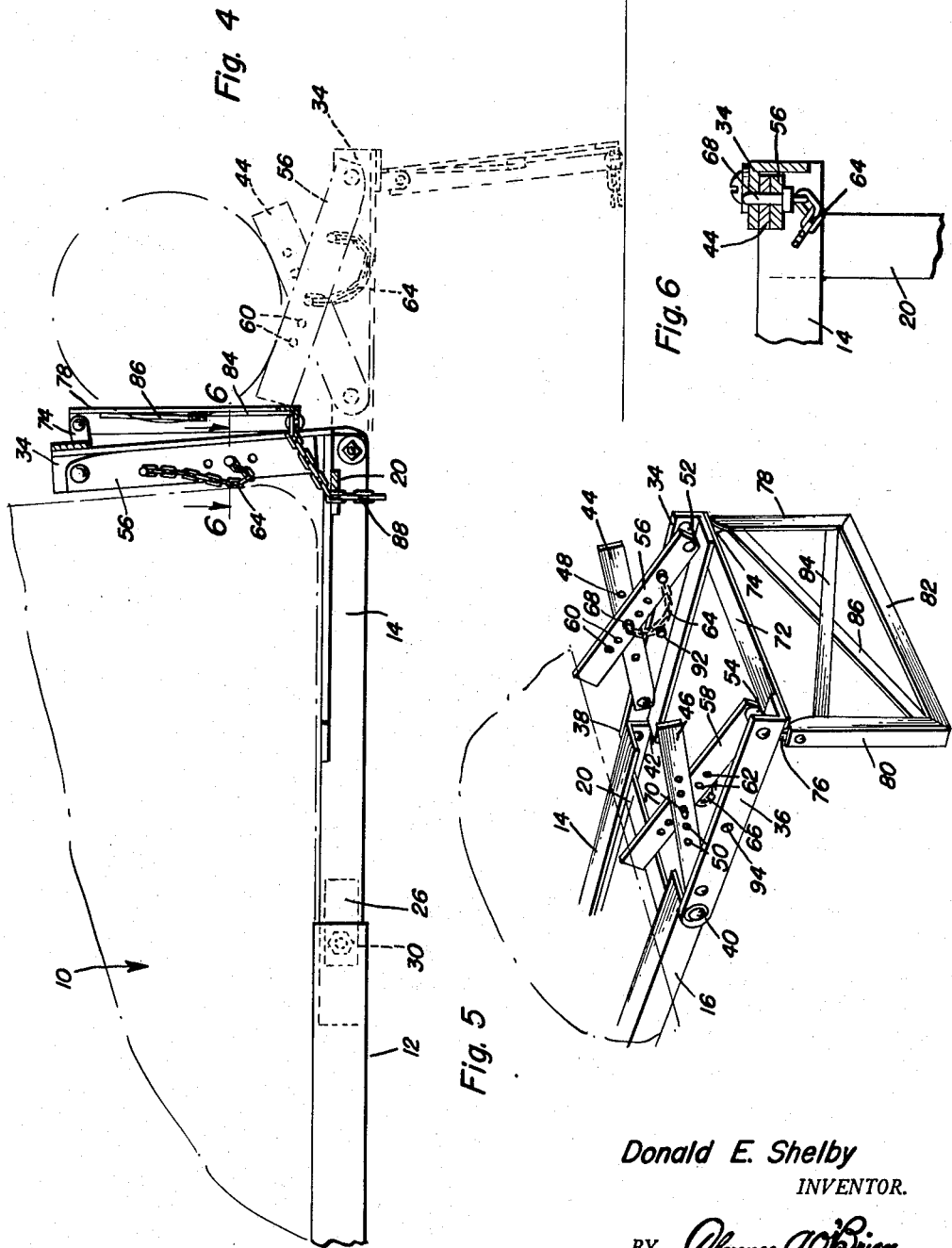
Donald E. Shelby
INVENTOR.

Patented Dec. 29, 1953

2,664,298

UNITED STATES PATENT OFFICE 2,664,298

FOLDING TRAILER DRUM RACK

Donald E. Shelby, Flint, Mich., assignor of fifty per cent to Kenneth W. Poling, Flint, Mich.

Application November 14, 1952, Serial No. 320,530

7 Claims. (Cl. 280—150)

1

This invention relates to an attachment for a trailer and more particularly to be a folding rack for supporting a fuel drum when a trailer is parked and in use as a shelter or home.

House trailers are in extensive use as permanent or temporary homes for many families or individuals. Due to the need for providing various utilities to the trailer such as water, electricity, and sewage disposal, trailer parks are popular means in use whereby the residents of trailers obtain such utilities. However, fuel for cooking and heating is usually carried in conventional drums in the trailer from one location to another. When arriving at a trailer park or other location, the drum is then supported and connected so that a gravity actuated supply of fuel will be available. In supporting the drum, the beauty and neatness of many trailer parks is often marred by ramshackle and unsightly arrangements of lumber or any other construction materials which may happen to be handy for use. It is, therefore, the primary object of this invention to provide an attachment for a trailer that may be readily used to support these drums, while being easily folded against the side of the trailer when not in use in an unobtrusive manner.

Still further objects of the invention reside in the provision of a folding trailer attachment that is strong, durable, capable of being readily attached to various makes and models of trailers, simple in construction and manufacture, and relatively inexpensive to produce.

These, together with various ancillary objects of the invention which will become apparent as the following description proceeds, are attained by this folding trailer attachment, a preferred embodiment of which has been illustrated in the accompanying drawings, by way of example only, wherein:

Figure 1 is a top plan view of the folding trailer attachment in a folded position, showing the manner of attachment to the frame or chassis of the trailer, and showing in dotted lines the manner in which the device may be extended to support a barrel or drum;

Figure 2 is a side elevational view of the invention shown in its folded position;

Figure 3 is a rear elevational view also showing the device in its folded position;

Figure 4 is a vertical sectional view as taken along the plane of line 4—4 in Figure 1 and showing in particular the construction of the supporting arms for holding the barrel or drum in an upright position;

2

Figure 5 is a perspective view showing the folding trailer attachment in an extended position ready to receive a drum thereon; and Figure 6 is a horizontal sectional detail view as taken along the plane of line 6—6 in Figure 4 showing the construction of the means for retaining the supporting arms in association with the side members.

With continuing reference to the accompanying drawings wherein like reference numerals designate similar parts throughout the various views, reference numeral 10 generally designates a house trailer having suitable chassis frame members 12 to which the folding trailer attachment may be readily secured. The folding trailer attachment includes a frame having a pair of spaced inwardly extending members 14 and 16. These members are rigidly secured to each other by transverse braces 18 and 20. The side frame members 14 and 16 are angle iron in shape and terminate in outwardly divergent portions 22 and 24 which carry substantially Z-shaped members 26 and 28 through which suitable fasteners 30 and 32 are threadedly engaged and extend. The fasteners 30 and 32 are adapted to clamp the frame 12 against the extensions 22 and 24.

There are provided angle-shaped members 34 and 36 which are provided with extensions 38 and 40 pivotally attached to the side frame members 14 and 16. The ends, as at 42, of the horizontally extending portions of the side members 34 and 36 are adapted to abut against the vertical end surfaces of the side frame members 14 and 16 to limit the downwardmost position of the side supporting members 34 and 36. Pivotally connected to the endmost portions of the vertical sides of the side supporting members 34 and 36 are arms 44 and 46 which are provided with a plurality of spaced apertures 48 and 50, respectively. Spacers 52 and 54 are provided for spacing arms 56 and 58 outwardly from the side members 34 and 36 in order that they may also be pivotally attached to the side members 34 and 36. Other apertures 60 and 62 are spaced from each other and extend through the arms 56 and 58, respectively. Carried by the arms 56 and 58 are chains 64 and 66 to which pins 68 and 70 are attached. The pins 68 and 70 are adapted to extend through selected aligned apertures 60 and 48 and apertures 50 and 62 in the respective arms when they are arranged in a position similar to that shown in Figure 5. A cross brace 72 is welded or otherwise secured to and extends between the side members 34 and 36.

Depending from the cross brace 72 are projecting plates 74 and 76. Pivotally depending from the plates 74 and 76 is a substantially U-shaped supporting member which may be constructed preferably from angle iron members suitably welded to each other. This U-shaped supporting member includes vertical portions 78 and 80 which are interconnected by a central connecting portion 82. Diagonal braces 84 and 86 are provided and are terminally welded or otherwise secured to the vertical portions 78 and 80 and are secured to each other medial the ends thereof. Carried by the central connecting member 82 is a chain 88 which is adapted to become engaged within a recess 90 formed in the brace 20.

In operation, the device is stored on the trailer after the side frame members 14 and 16 have been secured to the frame 12 of the trailer. Then, the side members 34 and 36 are rotated upwardly. The chain 88 is engaged with the brace 20 within the recess 90. Further, the pins 68 and 70 extend through the aligned apertures in the arms 44 and 56 and 46 and 58 and also extend through apertures 92 and 94 in the side members 34 and 36. In this manner, the device is maintained in a minimum compass and in unobtrusive appearance on the rear of the trailer.

When it is desired to lower the folding trailer attachment to a position where it may readily support a barrel, the pins 72 and 68 are disengaged as is the chain 88. Then, rotating the side members 34 and 36 and the lower supporting member including the vertical portions 78 and 80 and the interconnecting member 82 downwardly, they can be positioned as is shown in Figure 5. The plates 74 and 76 have their end portions so configurated as to permit the vertical members 78 and 80 to extend almost vertically upwardly but forming an obtuse angle with the side members 34 and 36 in order to prevent any inward collapsing of the device. Then, with the pins 68 and 70 in position as is shown in Figure 5, a barrel may then be readily placed in position between the upper portions of the respective arms.

Since from the foregoing, the construction and advantages of this folding trailer attachment can be readily understood, further description is believed to be unnecessary.

However, since numerous modifications and changes will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is:

1. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said drum supporting means including pairs of arms pivotally attached to opposite ends of said side frame members, and means for locking said pairs of arms in a crossed position with said arms extending at an acute angle relative to said side members.

2. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said drum supporting means including pairs of arms pivotally attached to opposite ends of said side frame members, and means for locking said pairs of arms in a crossed position with said arms extending at an acute angle relative to said side members, said side members being angle bars, said arms being received wholly within the confines of said side members.

3. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said drum supporting means including pairs of arms pivotally attached to opposite ends of said side frame members, and means for locking said pairs of arms in a crossed position with said arms extending at an acute angle relative to said side members, said side members being angle bars, said arms being received wholly within the confines of said side members, said means for locking said pairs of arms being adapted to secure said arms to said side members when the arms are in a depressed position.

4. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said supporting member being substantially U-shaped, a cross brace extending between said side members, said supporting member pivotally depending from said cross brace, said drum supporting means including pairs of arms pivotally attached to opposite ends of said side frame members, and means for locking said pairs of arms in a crossed position with said arms extending at an acute angle relative to said side members.

5. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said supporting member being substantially U-shaped, a cross brace extending between said side members, said supporting member pivotally depending from said cross brace, said drum supporting means including pairs of arms pivotally attached to opposite ends of said side frame members, and means for locking said pairs of arms in a crossed position with said arms extending at an acute angle relative to said side members, said side members being angle bars, said arms being received wholly within the confines of said side members.

6. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said drum supporting means including pairs of arms pivotally attached to opposite ends of said side frame members, and means for locking said pairs of arms in a crossed position with said arms extending at an acute angle relative to said side members, said side members being angle bars, said arms being received wholly within the confines of said side members, said means for locking said pairs of arms being adapted to secure said arms to said side members when the arms are in a depressed position, said supporting member being substantially U-shaped, a cross brace extending between said side members, said supporting member pivotally depending from said cross brace.

7. A folding trailer attachment adapted to support a drum comprising a frame adapted to be attached to a trailer, a pair of spaced parallel side members pivotally attached to said frame, a supporting member pivotally associated with said side members, and drum supporting means carried by said side members, said drum supporting means including pairs of arms pivotally attached to opposite ends of said side frame members, and means for locking said pairs of arms in a crossed position with said arms extending at an acute angle relative to said side members, said side members being angle bars, said arms being received wholly within the confines of said side members, said means for locking said pairs of arms being adapted to secure said arms to said side members when the arms are in a depressed position, said supporting member being substantially U-shaped, a cross brace extending between said side members, said supporting member pivotally depending from said cross brace, and means for limiting the rotation of said supporting member relative to said side members.

DONALD E. SHELBY.

References Cited in the file of this patent

UNITED STATES PATENTS

| Number | Name | Date |
|---|---|---|
| 1,451,006 | Blaw | Apr. 10, 1923 |
| 1,875,403 | Young | Sept. 6, 1932 |
| 2,160,958 | Critchlow | June 6, 1939 |
| 2,388,192 | Stechbart | Oct. 30, 1945 |
| 2,468,579 | Vuori | Apr. 26, 1949 |
| 2,643,395 | Stassino | June 30, 1953 |

FOREIGN PATENTS

| Number | Country | Date |
|---|---|---|
| 183,647 | Switzerland | Nov. 2, 1936 |
| 354,259 | Great Britain | Aug. 4, 1931 |